(12) United States Patent
Dickerson et al.

(10) Patent No.: US 6,279,697 B1
(45) Date of Patent: *Aug. 28, 2001

(54) BRAKE ROTOR WITH NON-DIRECTIONAL BRAKING SURFACE

(75) Inventors: Weston E. Dickerson, Milford, MI (US); Petar Jakovljevic, Mississauga (CA)

(73) Assignee: Hayes Lemmerz International, Inc., Northville, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/364,588

(22) Filed: Jul. 30, 1999

(51) Int. Cl.[7] .................................................... F16D 65/12
(52) U.S. Cl. .................................. 188/218 XL; 188/73.2; 188/250 G; 192/70.14
(58) Field of Search ............................ 188/218 XL, 73.2, 188/251 M, 261, 251 R, 251 A, 250 G, 250 E, 264 E, 218 A, 264 A, 264 AA, 73.1, 250 B, 218 R, 18 R; 192/107 M, 107 R, 70.14

(56) References Cited

U.S. PATENT DOCUMENTS

| | | |
|---|---|---|
| 1,860,375 | 5/1932 | Winterer et al. . |
| 3,073,424 * | 1/1963 | Russell . |
| 3,671,706 | 6/1972 | Littrell . |
| 3,680,375 | 8/1972 | Joy et al. . |
| 3,809,192 | 5/1974 | Stehle . |
| 4,156,479 | 5/1979 | Kawamura . |
| 4,286,694 | 9/1981 | Wiseman, Jr. et al. . |
| 4,448,291 * | 5/1984 | Ritsema et al. ................ 188/218 XL |
| 4,727,974 * | 3/1988 | Takatoshi ........................ 188/251 M |
| 5,078,248 | 1/1992 | Yesnik . |
| 5,480,007 | 1/1996 | Hartford . |
| 5,509,510 | 4/1996 | Ihm . |
| 5,664,648 | 9/1997 | Hester . |
| 5,765,667 * | 6/1998 | Röss et al. ...................... 188/218 XL |
| 5,816,901 * | 10/1998 | Sirany . |

FOREIGN PATENT DOCUMENTS

| | | |
|---|---|---|
| 3049325 | 12/1980 | (DE) . |
| 0109530 * | 2/2001 | (WO) . |

* cited by examiner

*Primary Examiner*—Douglas C. Butler
(74) *Attorney, Agent, or Firm*—Marshall & Melhorn, LLC

(57) ABSTRACT

The invention is a brake rotor. The rotor includes a radially inner mounting section with a central mounting face for attaching the rotor to a wheeled vehicle. The mounting face has a plurality of fastener apertures and a central aperture. A hat wall extends axially from the periphery of the mounting face. The rotor also includes a radially outer annular friction section. The friction section has a pair of opposite friction surfaces machined to predetermined dimensions. Each machined friction surface is non-directional in that it does not include directional indentations. The non-directional friction surfaces include non-directional indentations such as dimples or pits.

12 Claims, 3 Drawing Sheets

BRAKE ROTOR WITH NON-DIRECTIONAL BRAKING SURFACE

BACKGROUND OF THE INVENTION

The present invention relates to rotors for caliper disc brakes and the like, and in particular to a rotor having a friction surface machined by an electric discharge grinding machine and a method for making the same.

Rotors are generally well known in the art, and are used extensively in vehicle braking systems. Vehicle caliper disc braking systems slow the vehicle by inhibiting the rotation of the vehicle wheels. Rotors used in typical vehicle braking systems include a central hat section for attaching the rotor to a vehicle wheel and drive member for rotation therewith, and an outer friction section having opposite friction surfaces.

A caliper assembly is secured to a non-rotating component of the vehicle, such as the vehicle frame. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted to the rest of the rotor and to other components to which the rotor is connected.

Brake rotors are typically cast from a ferrous material, such as cast or grey iron. The rotors are then machined in multiple operations to shape the rotor, to form the inner mounting section and friction surfaces. However, ferrous material rotors are relatively heavy and they corrode during normal use. Brake rotors are also cast from aluminum based metal matrix composite (MMC) containing silicon carbide particulate reinforcement. Aluminum MMC rotors have sufficient mechanical and thermal properties at a significantly reduced weight compared to ferrous metal rotors. Typically, the rotor is cast from aluminum MMC and then machined in a conventional manner to form the finished rotor.

During the manufacture of the rotor, the friction surfaces of the rotor are machined to a predetermined tolerance range. Conventional machining techniques for rotors use physical contact between the friction surface and a tool to achieve a finish machined surface. For example, the friction surfaces are machined by grinding the friction surfaces against one ore more grinding wheels, or by turning the friction surfaces on a lathe against one or more cutting tools.

A continuous method for machining the friction surfaces of the rotor utilizes a CNC (computer numerical control) lathe. The CNC lathe includes a pair of cutters located on opposite sides of the rotor and initially positioned at either an inward or outward radial direction (depending on their initial position) relative to the axis of the rotor as the rotor is turned. While appearing to produce substantially flat surfaces, the cutters actually operate to machine spiral grooves in each of the friction surfaces of the rotor.

It also known to machine the friction surfaces by using an "interrupted" turning method. According to this method, the cutters machine in a radial direction relative to the axis of the rotor to a predetermined distance, at which point the cutters dwell for a predetermined time while the rotor continues to rotate. This creates a single groove extending circumferentially around the friction surfaces of the rotor a full 360°. The cutters continue machining in the radial direction until the next predetermined distance is reached, at which point the cutters dwell for a single rotation of the rotor to form another separate groove. This pattern is repeated throughout the machining operation to produce progressively smaller or larger circumferential grooves. These type of grooves may also be referred to as concentric grooves.

Other machining techniques, such grinding, are known to form grooves on the surface of a rotor which do not extend a full 360° around the circumference of the rotor. The groove may extend along only a portion the circumference of the friction surface of the rotor. As the groove extends along the portion of the circumference of the friction surface of the rotor, the groove may also extend inwardly or outwardly in the radial direction. It is also known to grind the friction surfaces of the rotor in both the clockwise and the counter-clockwise directions forming grooves that intersect each other.

The friction surface of a rotor may also be machined by roller burnishing. Roller burnishing is a cold-working process that uses pressure rolling techniques to manipulate the surface material of a work piece. In the case of a rotor, the roller burnishing may be used as a finish machining step to reduce the size of the peaks of the grooves on the friction surface of the rotor created by other conventional machining operations. However, roller burnishing does not remove all of the grooves created during the prior rough machining step.

The grooves or directional markings on the friction surface of the rotor produces undesirable results. The grooves cause the brake pads of the caliper assembly to move in the radial direction on the braking surface of the rotor during braking. The combination of the grooves in the friction surface of the rotor and the movement of the brake pads manifest themselves as "clacking" or other undesirable noise, pedal pulsations. Additionally, grooves in the braking surface can cause non-uniform wear of the pads and the braking surface.

It is desirable to provide a brake rotor having braking surfaces which are machined to predetermined tolerances without having grooves or directional markings.

SUMMARY OF THE INVENTION

The invention is an improved surface for a brake rotor, preferably a cast brake rotor. The rotor casting includes a radially inner mounting section having a mounting face for attaching the rotor to an associated drive member, such as a spindle or vehicle axle. A hat wall extends generally axially from the periphery of the mounting face. The hat wall is preferably straight and cylindrical extending at a right angle from the mounting section, however, the hat wall may be inclined, forming a portion of a cone, or it may be curved. The mounting face has a central pilot aperture cast therein, in which the drive member is closely received. Fastener apertures may be cast into the mounting face for receiving fasteners to secure the rotor to the drive member. Alternatively, the fastener apertures may be machined into the rotor casting using conventional machining techniques.

The rotor also includes a radially outer annular friction section having opposite friction surfaces which interface with associated friction members, such as brake pads or the like. The friction surfaces have a non-directional surface without grooves or directional markings. The annular friction section of the rotor has a radially inner edge and a radially outer edge. An annular recess is formed between the hat wall and the radially inner edge of the friction section. Optional vents may extend radially or axially through the friction section for cooling.

The invention also includes a method of machining a brake rotor with an electric discharge grinding (EDG) apparatus also known as an electric discharge machining apparatus. First, the brake rotor is cast to produce a brake rotor casting having a radially inner mounting section with generally axially extending hat wall, a radially outer annular friction section having a radially inner edge, and an annular recess formed between the hat wall and the radially inner edge of the friction section. The rotor casting is then mounted on the EDG apparatus thereby electrically connecting the rotor to ground. The rotor is rotated. An electrode ring of the EDG apparatus is submerged in a dielectric oil and is also rotated.

First electrodes are electrically connected to a first power supply and a second electrodes are electrically connected to a second power supply. The rotating rotor is then at least partially submerged in the dielectric oil and moved close to the electrode ring such that sparks transmit form between the discharge surfaces of the first and second electrodes and the rotor, which vaporize a portion of the surface of the rotor. The rotor and electrode ring are rotated in opposite directions while the sparks are generated between them until a sufficient amount of material is removed to achieve a rotor with a finished friction section having the desired dimensions. The opposite friction surface may be machined in a variety of different ways, including using a second electrode ring adjacent that side and simultaneously finishing both sides, moving the electrode ring to the opposite side and finishing it in a similar manner as the first side described above, or by turning the rotor over on the component mount and repeating the previously described steps.

BRIEF DESCRIPTION OF THE DRAWINGS

These and other advantages of the invention will be further understood and appreciated by those skilled in the art by reference to the following written specification, claims and appended drawings in which:

DETAILED DESCRIPTION OF THE PREFERRED EMBODIMENTS

Figure 1:
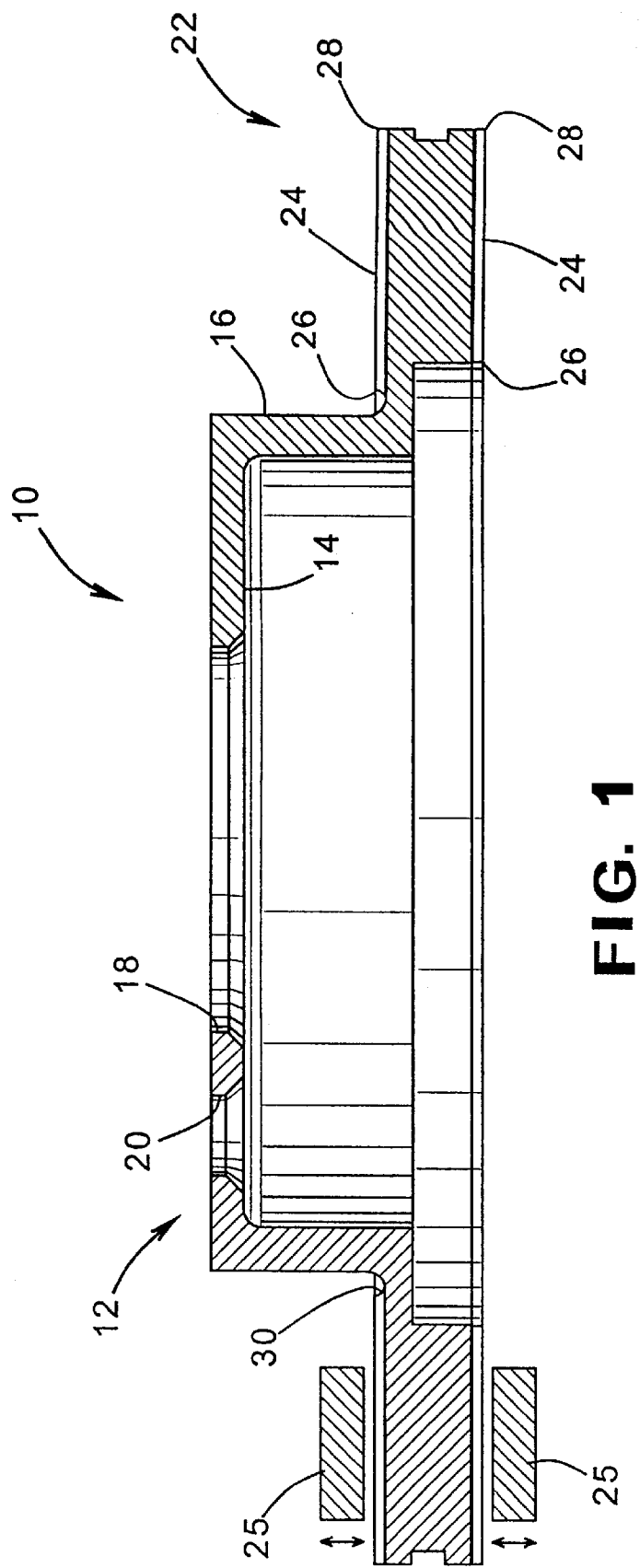
FIG. 1 is a cross sectional elevational view of a brake rotor having a braking surface.

For purposes of description herein, the terms "upper," "lower," "right," "left," "rear," "front," "vertical," "horizontal," and derivatives thereof shall relate to the invention oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a rotor casting 10 is illustrated. The rotor 10 is formed by casting aluminum MMC in a conventional manner to produce the casting having physical dimensions which are close to the desired final dimensions. However, the rotor may be formed from other suitable materials such as iron, and preferably cast iron. The rotor 10 is then machined using an Electric Discharge Grinding (EDG) apparatus, also referred to as an Electric Discharge Machining (EDM) apparatus, suitable for machining the annular friction surface. An example of a suitable EDG apparatus may be found in pending U.S. patent application Ser. No. 09/193,063, filed Nov. 16, 1998. This application is a continuation-in-part of pending U.S. patent application Ser. No. 09/064,484, filed Apr. 22, 1998. U.S. patent application Ser. Nos. 09/193,063 and 09/064,484 are hereby incorporated herein by reference.

The rotor 10 includes a radially inner mounting section 12 having a central, generally circular mounting section 14 which mounts the rotor 10 on an associated drive member of a wheeled vehicle (not shown), such as a spindle or vehicle axle. A hat wall 16 extends generally axially from the periphery of the mounting face 14. The hat wall 16 is preferably straight and cylindrical extending at a right angle from the mounting face 14, however, the hat wall may be inclined, forming a portion of a cone, or it may be curved. The central mounting face 14 has a central pilot aperture 18 cast therein, in which the drive member is closely received. Fastener apertures 20 may be cast into the central mounting face 14 for receiving fasteners to secure the rotor 10 to the drive member. Alternatively, the fastener apertures 20 may be machined into the rotor 10 using conventional machining techniques.

The rotor 10 also includes a radially outer annular friction section 22 having opposite friction surfaces 24 which interface with associated friction members 25, such as brake pads or the like, as described above. The annular friction section 22 of the rotor 10 has a radially inner edge 26 and a radially outer edge 28. An annular recess 30 is disposed adjacent the hat wall 16 at the radially inner edge 26 of the friction section 22. Optional vents (not shown) may extend through the friction section 22 for cooling.

Figure 2:
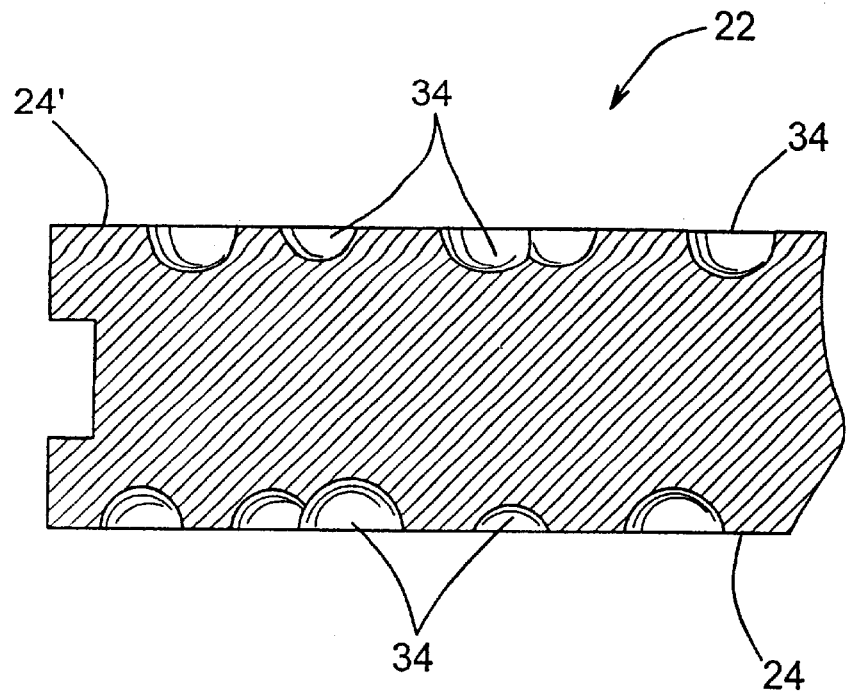
FIG. 2 is an enlarged portion of a cross sectional view of the brake rotor shown in FIG. 1 having a non-directional braking surface in accordance with this invention.
Figure 3:
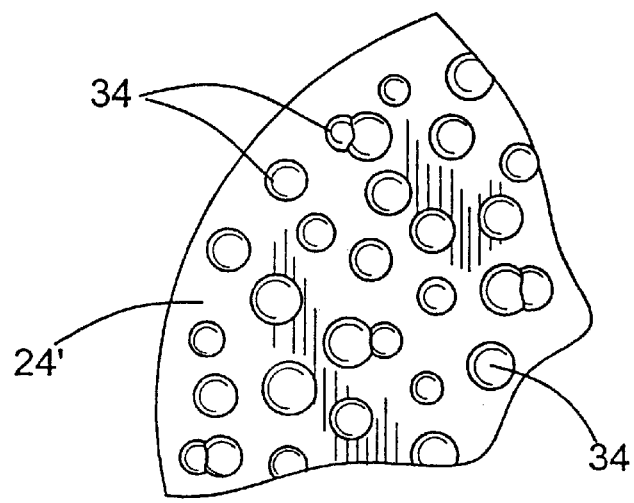
FIG. 3 is an enlarged portion of a plan view of the non-directional braking surface shown in FIG. 2.

Referring now to FIGS. 2 and 3, the friction surfaces 24 are finished machined to predetermined tolerances by the EDG process described below to create a non-directional friction surface 24' having a plurality of non-directional indentations 34 also referred to as dimples, or pits. The non-directional indentations are preferably approximately 1 to 50 microns deep, and more preferably 20 microns deep, although any suitable depth may be used. The non-directional indentations 34 are preferably disposed in a random pattern in the braking surface 24'. The non-directional indentations 34 may optionally overlap each other.

A directional indentation defines an area at the surface having a length and a width, such that the length is substantially longer than the width. The length of a directional indentation is substantially longer than the width when it is longer than at least 1.5 times the width, and preferably longer than twice the width, and more preferably longer than 4 times the width. Examples of directional indentations include grooves, channels, troughs and the like. Accordingly, a non-directional indentation 34 defines an area at the surface which does not have a length and a width, such that the length is substantially longer than the width as defined above. The non-directional indentations 34 in the non-directional braking surface 24' preferably define areas at the surface which are substantially circular (as shown in FIG. 3), although any non-directional indentation conforming to the definition given above may be used.

Figure 4:
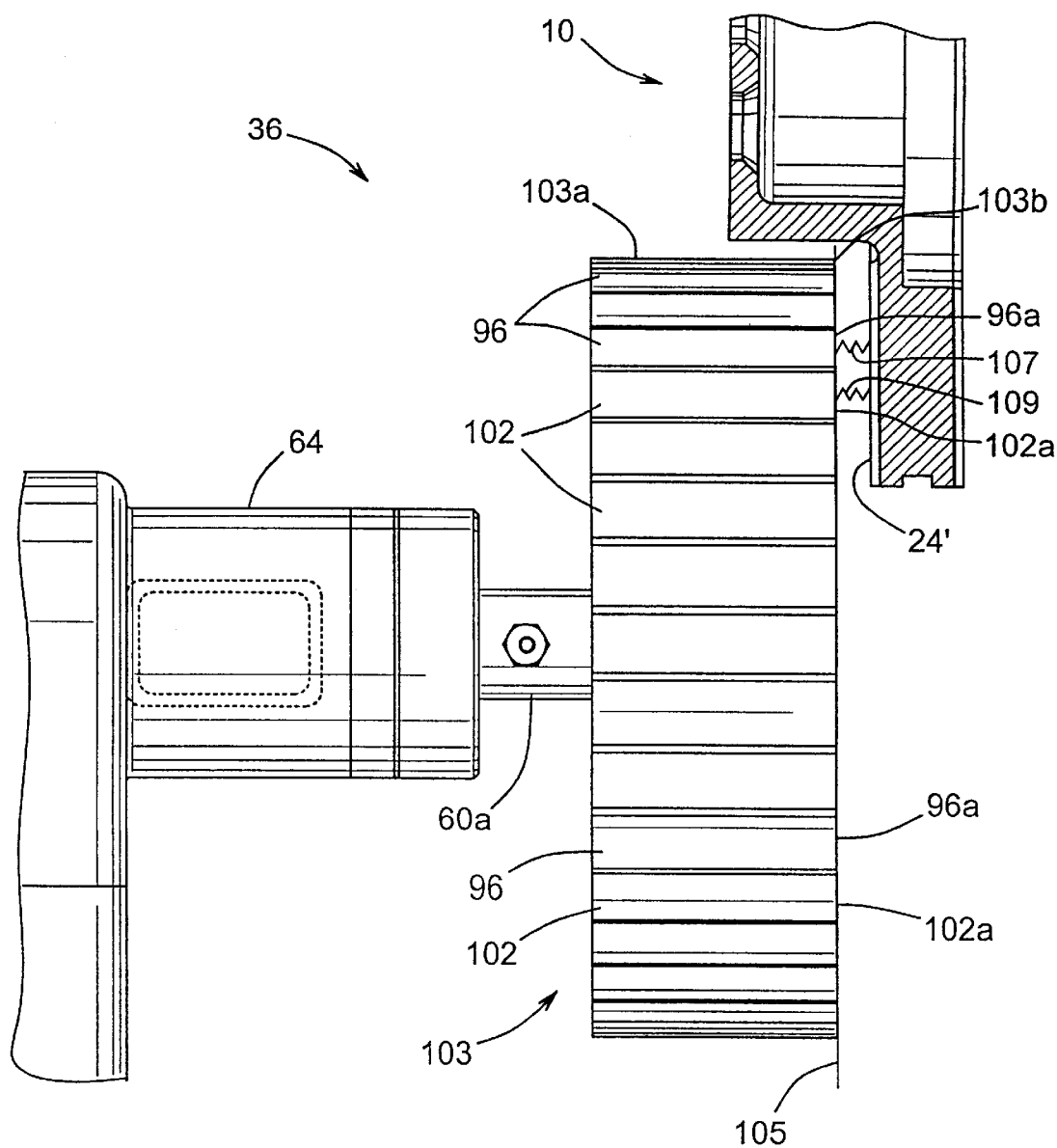
FIG. 4 is a side elevational view of a rotor being machined in by an electric discharge grinding machine in accordance with this invention.

Referring now to FIG. 4, the method of machining a brake rotor with an EDG apparatus shall now be described. The brake rotor 10 is cast to produce a brake rotor 10 as described above. The rotor 10 is then mounted on the EDG apparatus 36. The EDG apparatus 38 includes an electrode ring 103 having a first set of electrodes 96 and a second set of electrodes 102. The electrodes include corresponding discharge surfaces 96a and 102a defining a plane 105.

The first electrodes 96 are electrically connected to a first power supply (not shown) and the second electrodes 102 are electrically connected to a second power supply (also not shown). The rotor is electrically connected to ground and rotated. As stated in the incorporated applications, machining can be accomplished by using any number of sets of electrodes. The rotating rotor 10 is then at least partially submerged in the dielectric oil (not shown) and moved close to the electrode ring 103 such that electrical energy is transferred between the electrode discharge surfaces 96a and 103a, and the braking surface of the rotor 24 in the form of sparks 107 and 109. A high temperature is reached where the sparks 107 and 109 contacts the metal braking surface 24. The high temperature vaporizes the metal at that location. The vaporization of the metal surface creates the non-directional impression 34 as described above in the surface at that location. The rotor 10 and the electrode ring 103 are rotated producing a series of sparks at different locations on the braking surface until a sufficient amount of material is removed from the friction surface 24 to create a non-directional braking surface 24' having the desired predetermined dimensions.

The opposite friction surface 24 may be machined in a variety of different ways, including using a second electrode ring adjacent that side and simultaneously finishing both sides. Alternatively, the rotor 10 may be turned over on the component mount of the EDG apparatus 36 and the previously described steps would be repeated. Although the method described is for machining the friction surfaces of a rotor, other surfaces of the rotor may be machined in a similar manner.

EDG offers advantages over conventional machining in that the EDG apparatus does not physically contact the part thereby improving the tolerances of the finished part. A brake rotor having at least one friction surface machined by EDG has improved tolerances. The brake rotor machined by EDG does not include directional indentations. The brake rotors machined by EDG do not exhibit clacking, and have demonstrated reduced noise, less pedal pulsation, and greater wear uniformity.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A brake rotor comprising a friction section having at least one non-directional friction surface from which material has been removed to form a plurality of indentations in said surface, and each of said indentations is formed from one or more non-directional indentations disposed in a random pattern about said surface.

2. A brake rotor as defined in claim 1, wherein said non-directional friction surface is annular.

3. A brake rotor as defined in claim 1, wherein said non-directional friction surface includes a plurality of non-directional indentations.

4. A brake rotor as defined in claim 3, wherein said non-directional indentations are dimples.

5. A brake rotor as defined in claim 3, wherein said non-directional indentations define areas at said braking surface which do not have lengths that are substantially longer than widths.

6. A brake rotor as defined in claim 5, wherein said non-directional indentations define areas at said braking surface which are substantially circular.

7. A brake rotor as defined in claim 3, wherein said non-directional indentations define areas at said braking surface having lengths and widths such that said lengths are less than 4 times the widths.

8. A brake rotor as defined in claim 7, wherein said non-directional indentations define areas at said braking surface having lengths and widths such that said lengths are less than 2 times the widths.

9. A brake rotor as defined in claim 8, wherein said non-directional indentations define areas at said braking surface having lengths and widths such that said lengths are less than 1.5 times the widths.

10. A brake rotor as defined in claim 1, wherein said friction section is constructed from material including aluminum.

11. A brake rotor as defined in claim 1, wherein said friction section is constructed from aluminum MMC.

12. A brake rotor as defined in claim 1, wherein said friction section is constructed from cast iron.

* * * * *